(12) United States Patent
Kamiyama et al.

(10) Patent No.: US 7,746,617 B2
(45) Date of Patent: Jun. 29, 2010

(54) OVERLOAD RELAY AND OPERATING METHOD THEREOF

(75) Inventors: Tomoyuki Kamiyama, Tokyo (JP); Tsuyoshi Sekiguchi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 728 days.

(21) Appl. No.: 11/658,398

(22) PCT Filed: Apr. 19, 2006

(86) PCT No.: PCT/JP2006/308202
§ 371 (c)(1),
(2), (4) Date: Jan. 26, 2007

(87) PCT Pub. No.: WO2007/122703
PCT Pub. Date: Nov. 1, 2007

(65) Prior Publication Data
US 2009/0027817 A1   Jan. 29, 2009

(51) Int. Cl.
*H02H 3/00* (2006.01)
(52) U.S. Cl. ..................................... 361/115
(58) Field of Classification Search ................ 361/115, 361/75, 94; 307/652
See application file for complete search history.

(56) References Cited
U.S. PATENT DOCUMENTS
3,973,208 A * 8/1976 Diamond .................... 307/652
4,412,267 A * 10/1983 Hansen ........................ 361/94
5,657,194 A * 8/1997 Waltz ........................... 361/75

FOREIGN PATENT DOCUMENTS

| JP | 57-20118 A | 2/1982 |
|----|------------|--------|
| JP | 2-166946 A | 6/1990 |
| JP | 3-123234 A | 5/1991 |
| JP | 6-165523 A | 6/1994 |
| JP | 11-72522 A | 3/1999 |
| JP | 3263979 B2 | 3/2002 |
| JP | 2004-22203 A | 1/2004 |
| KR | 1993-0017261 | 8/1993 |
| KR | 1999-0033938 | 5/1999 |

OTHER PUBLICATIONS

Notice of Allowance dated Mar. 27, 2009 for Korean Application 10-2007-700356.

* cited by examiner

*Primary Examiner*—Stephen W Jackson
*Assistant Examiner*—Angela Brooks
(74) *Attorney, Agent, or Firm*—Sughrue Mion, PLLC

(57) ABSTRACT

An overload relay, which trips a current flow between a power source and a load, includes a trip capacitor that stores therein an electric charge to excite a trip coil so as to trip the current flow, a reset capacitor that stores therein an electric charge to excite a reset coil so as to reset the tripped current flow, an energizing unit that energizes the coils, and a capacitor-diagnosing unit that diagnoses the capacitors. The energizing unit forcibly energizes the trip coil by using the trip charge when the capacitor-diagnosing unit diagnoses that there is a degradation of a property of the trip capacitor.

7 Claims, 5 Drawing Sheets

A : NORMAL RANGE

B : REPLACEMENT RECOMMENDATION RANGE

C : DEGRADATION RANGE

OVERLOAD RELAY AND OPERATING METHOD THEREOF

TECHNICAL FIELD

The present invention relates to an overload relay, and, more specifically to a self-feeding-type overload relay that detects a load current with a current detector such as a CT (Current Transformer) and a hall element and that self-supplies an operation power, and a method of operating the overload relay.

BACKGROUND ART

An overload relay is an electric switch that is generally used in a field of industrial machines and industrial facilities, as a unit that protects electric devices (such as a motor, hereinafter, "load") from damage generated due to overheating or an excessive current. This overload relay is generally used as an electromagnetic switch which is combined with a separate relay called an electromagnetic contactor having no current detecting function. This electromagnetic switch is inserted into a current path that connects between a power source and the load, thereby protecting the load to be protected. In other words, when the overload relay detects an overload state, power is supplied to a coil (a trip coil) equipped in the overload relay. A contact part within the overload relay becomes open due to an excitation work of the conducted trip coil, and the excitation of the coil of the electromagnetic contactor that is serially connected to the contact part is cancelled. As a result, the contact of the electromagnetic contactor is operated to become an open state. Consequently, a power supply to the load is interrupted, thereby preventing the load from being damaged.

The overload relay includes a thermomotive overload relay having a bimetal element or a resistive heater, and an electronic overload relay in which a control device such as a microcomputer performs a switch control based on a load current detected by a current detector such as a CT and a hall element. Particularly, the latter electronic overload relay has low power, and therefore, attracts attention as an overload relay with excellent easiness of control. Many overload relays of this type are available.

According to the former typical thermomotive overload relay and the former typical electronic overload relay, when the electromagnetic switch becomes open, a power supply to the own overload relay is also interrupted. Therefore, a recovery operation needs to be manually carried out. A product that drives an overload relay using a separate power source is also available. However, when this product is used, a power source of a separate system needs to be prepared in addition to a power source system that drives the load, which increases the facility cost. Therefore, this product is not used except for a special use.

On the other hand, many industrial machines operate in recent industrial facilities, and their operations are automated. When an operator performs a recovery operation of a trip-operated overload relay at the site at each time of the trip operation, the work efficiency is significantly reduced. Therefore, there has been a request from users for a self-feeding-type overload relay that automatically performs a recovery operation after a lapse of a predetermined time of the trip operation.

For example, Patent Document 1 discloses a technique of preventing execution of a reset operation before cooling of the load or a recovery from an abnormal state, in an overload relay which is not of a self-feeding-type. According to the Patent Document 1, attention is focused on a point that a mechanical thermomotive overload relay has a function of not resetting the operation until even when the heater is cooled even when a reset bar operates in a manual reset mode. Based on this, an electronic overload relay realizes a function equivalent to this function of the mechanical thermomotive overload relay.

Patent Document 1: Japanese Patent Application Laid-Open No. 2004-22203

DISCLOSURE OF INVENTION

Problems to be Solved by the Invention

However, since the self-feeding-type overload relay uses a capacitor as a power source that performs a trip operation, the trip operation inevitably receives an influence of degradation of the capacitor. Particularly, when the degradation of the capacitor progresses to an extent that the trip operation cannot be performed, there is a risk of damaging the load to be protected. In the worst case, this leads to fire in the load or other machinery. It can be said that the self-feeding-type electronic overload relay is not fully distributed for the above reasons.

The present invention has been achieved in view of the above points. It is an object of the present invention to provide a self-feeding-type electronic overload relay that can securely execute a trip operation and can securely and safely stop a load to be protected which is connected to the overload relay, and a method of operating the overload relay.

Means for Solving Problem

To overcome the above problems and achieves the object mentioned above, according to the present invention, an overload relay includes a trip capacitor that operates as a trip power source; a reset capacitor that operates as a reset power source; a trip coil that is excited by a charge stored in the trip capacitor; a reset coil that is excited by a charge stored in the reset capacitor; an energizing unit that energizes the trip coil and the reset coil; and a current monitoring unit that monitors a magnitude of the current which flows through a current path connecting between a power source and a load, wherein the controller includes a trip-power-source degradation-diagnosing unit that diagnoses a degradation state of the trip capacitor, and the trip-power-source degradation-diagnosing unit forcibly excites the trip coil, when the trip-power-source degradation-diagnosing unit determines a degradation of the trip capacitor.

EFFECT OF THE INVENTION

According to the overload relay of the present invention, when a trip-power-source degradation-diagnosing unit determines a degradation of a trip capacitor, the trip-power-source degradation-diagnosing unit forcibly excites a trip coil. Therefore, a trip operation can be securely executed. Further, a load to be protected that is connected to the overload relay can be securely and safely stopped.

BRIEF DESCRIPTION OF DRAWINGS

FIG. 3-1 is a flowchart showing a control flow of a display control of the overload relay;

FIG. 3-2 is a flowchart showing an operation flow of a forced trip based on a degradation diagnosis of the capacitor.

EXPLANATIONS OF LETTERS OR NUMERALS

Figure 1:
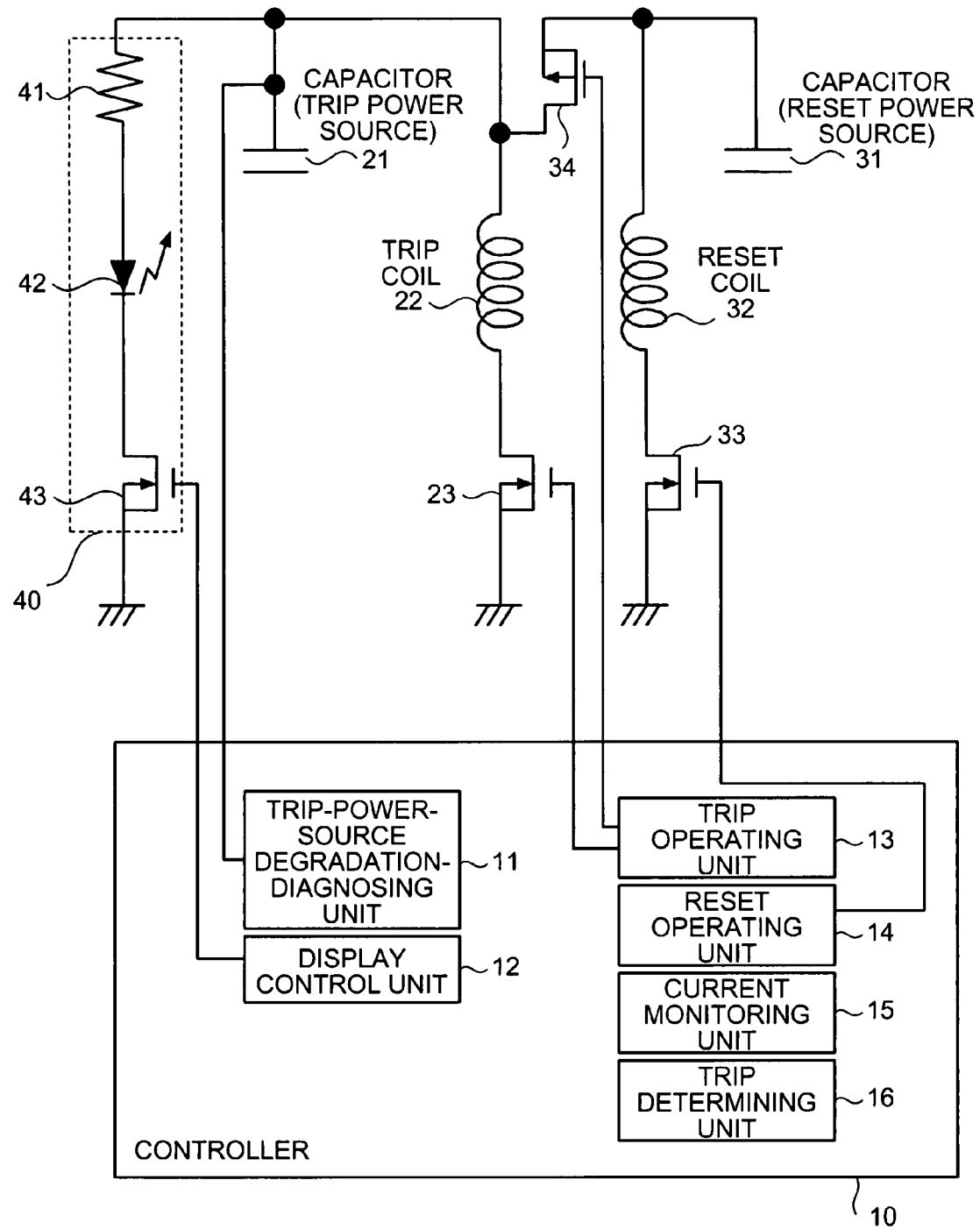
FIG. 1 is a configuration diagram of an overload relay according to a first embodiment of the present invention.

10 Controller
11 Trip-power-source degradation-diagnosing unit
12 Display control unit
13 Trip operating unit
14 Reset operating unit
15 Current monitoring unit
16 Trip determining unit
21, 31 Capacitor
22 Trip coil
23, 33, 34, 43, 52, 53 Switching element
32 Reset coil
40 Display unit
41 Resistor element
42 LED
51 Trip reset coil

BEST MODE(S) FOR CARRYING OUT THE INVENTION

Exemplary embodiments of an overload relay and an operating method thereof according to the present invention will be explained in detail below with reference to the accompanying drawings. The invention is not limited to the embodiments.

First Embodiment

FIG. 1 is a configuration diagram of an overload relay according to a first embodiment of the present invention. The overload relay shown in FIG. 1 includes a controller 10 that is incorporated in the overload relay and that controls the entire operation of the overload relay. The overload relay also includes capacitors 21 and 31, a trip coil 22, a reset coil 32, switching elements 23, 33, 34, and 43, a resistor element 41, and a light-emitting diode (hereinafter, LED) 42, that are controlled by the controller 10. The capacitor 21 operates as a trip power source for operating the trip coil 22. Similarly, the capacitor 31 operates as a reset power source for operating the reset coil 32. A series circuit of the resistor element 41, the LED 42, and the switching element 43 functions as a display unit 40 that displays a degradation state of the capacitor 21 as described later.

As shown in FIG. 1, the controller 10 includes a trip-power-source degradation-diagnosing unit 11, a display control unit 12, a trip operating unit 13, a reset operating unit 14, a current monitoring unit 15, and a trip determining unit 16, as constituent elements.

Each element that constitutes the overload relay shown in FIG. 1 and a structure of connection between each element and each functional unit of the controller 10 are explained next. With reference to FIG. 1, one end of the capacitor 21 that constitutes the trip power source is connected to one end of the trip coil 22 and one end of the display unit 40, respectively, and the other end of the display unit 40 is grounded. The other end of the trip coil 22 is connected to a drain of the switching element 23 as an N-type FET, for example, and a source of the switching element 23 is grounded.

On the other hand, one end of the capacitor 31 that constitutes the reset power source is connected to one end of the reset coil 32 and one end of a source of the switching element 34 as a P-type FET, for example, respectively. A drain of the switching element 34 is connected to one end of the trip coil 22. The other end of the reset coil 32 is connected to a drain of the switching element 33 as an N-type FET, for example, and a source of the switching element 33 is grounded.

The controller 10 is connected as follows. The trip-power-source degradation-diagnosing unit 11 is connected to one end of the capacitor 21. The display control unit 12 is connected to a gate of the switching element 43. The trip operating unit 13 is connected to a gate of the switching element 23 and a gate of the switching element 34, respectively. The reset operating unit 14 is connected to a gate of the switching element 33.

The configuration shown in FIG. 1 is one example, and can be changed variously within a range not deviating from a gist of the present invention. For example, while the switching elements 22, 33, and 43 are disposed at a low side (a low-potential side (a ground side in the configuration shown in FIG. 1)) in the configuration shown in FIG. 1, these switching elements can be also disposed at a high side (a high-potential side). In the configuration of switching shown in FIG. 1, while each of the switching elements 23, 33, 43 uses an N-type FET, and the switching element 34 uses a P-type FET, these types are optional. However, from the viewpoint of easily configuring the overload relay, needless to mention, it is preferable to select a suitable type according to a position at which each switching element is disposed and the like.

The operation of the overload relay shown in FIG. 1 is explained next. With reference to FIG. 1, the current monitoring unit 15 monitors a current that is detected by a current detector (not shown) such as a CT and a hall element. The trip determining unit 16 determines an overcurrent and a phase failure state, based on a result of monitoring by the current monitoring unit 15. When the trip determining unit 16 determines that the overcurrent and the phase failure state occur, the trip operating unit 13 turns on the switching element 23 to energize the trip coil 22. A charge stored in the capacitor 21 that operates as a trip power source is used to energize the trip coil 22. On the other hand, when the overcurrent and the phase failure state are cancelled, the reset operating unit 14 turns on the switching element 33 to energize the reset coil 32. To energize the reset coil 32, a charge stored in the capacitor 31 that operates as a reset power source is used.

The overload relay according to the present embodiment has the following two control modes in addition to the above control mode.

A first control mode (a forced trip) to be added is as follows. The trip-power-source-degradation-diagnosing unit 11 detects a voltage at one end of the capacitor 21 that operates as a trip power source, and diagnoses a degradation state of the capacitor 21. In diagnosing the degradation state, a conventional method of using a relationship between a discharge time of periodically discharging from the capacitor and a voltage difference can be used. The trip operating unit 13 turns on the switching element 23 according to a result of diagnosis performed by the trip-power-source degradation-diagnosing unit 11, and further turns on the switching element 34. In this control, charges stored in both the capacitor 21 and the capacitor 31 are used to energize the trip coil 22. Therefore, even when the charge stored in the capacitor 21 becomes small due to progressed degradation of the capacitor 21, the trip coil 22 can be operated. A detailed process of turning on the switching element 34 at the same time is described later.

A second control mode (a display control) to be added is as follows. The result of diagnosis performed by the trip-power-source degradation-diagnosing unit 11 is stored. The display control unit 12 changes an interval of turning-on control of the switching element 43, based on a result of the last diagnosis performed by the trip-power-source degradation-diagnosing unit 11. By this control, a light emitting interval of the LED 42 can be changed. Therefore, information on the degradation state of the capacitor can be transmitted to a user via the LED 42. Details of the display control are also described later.

Figure 2:
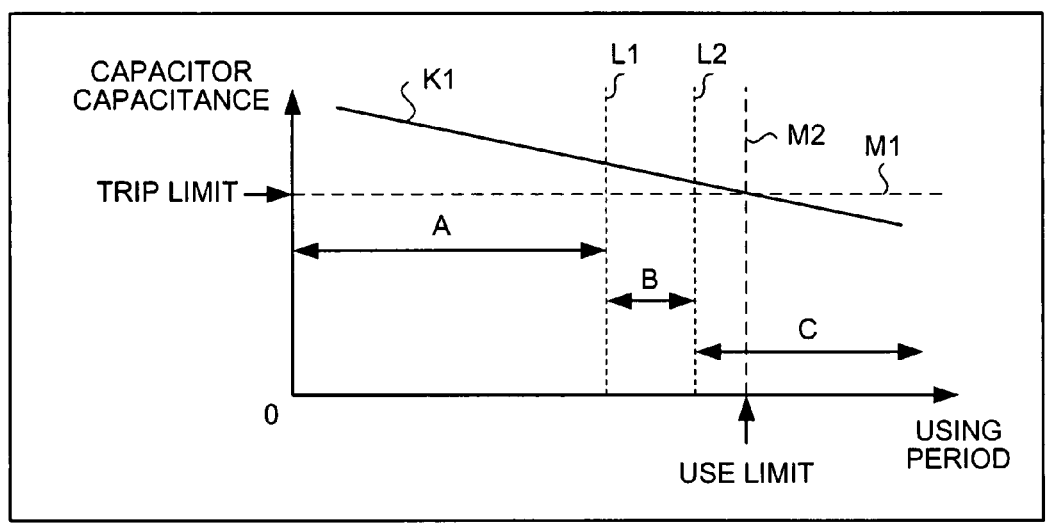
FIG. 2 depicts states of a capacitor on a degradation curve of a capacitor capacitance.

FIG. 2 depicts states of a capacitor on a degradation curve of a capacitor capacitance. In FIG. 2, a solid line K1 is a degradation curve showing degradation of the capacitance of the capacitor corresponding to a using period of the capacitor. A broken line M1 is a trip limit line showing a boundary of the capacitance at which the trip coil cannot be driven. A broken line M2 that passes an intersection between the broken line M1 and the degradation curve K1 and is orthogonal with the broken line M1 is a use limit line showing a boundary of a usable period of the capacitor. Since the capacitor is a limited-life product, the capacitance of the capacitor becomes low when the using period becomes long, and the stored charge also decreases, as shown by the degradation curve K1. When the using period exceeds the use limit prescribed by the use limit line M2, the capacitance of the capacitor reaches a level equal to or below a limit value prescribed by the trip limit line M1, and it becomes impossible to drive the trip coil. Therefore, to securely operate the overload relay, degradation of the capacitor needs to be diagnosed properly and periodically.

The degradation curve K1 shown in FIG. 2 shows a general (or an ideal) degradation characteristic of a capacitor capacitance, and there is no guarantee that the capacitance of an actually used capacitor coincides with this degradation curve K1. Therefore, in the present embodiment, boundary lines L1 and L2 that are parallel with the use limit line M2 are provided at the inside (at the origin side) of the use limit lime M2. Further, the following three zones A, B, and C (see FIG. 2) that are divided by the boundary lines L1 and L2 are defined, thereby securing margin for reliably operating the overload relay.

(1) Zone A: a normal range (a normal state)
(2) Zone B: a replacement recommendable range (a replacement recommendation state)
(3) Zone C: a degradation range (a degradation state)

Figures 1, 3:
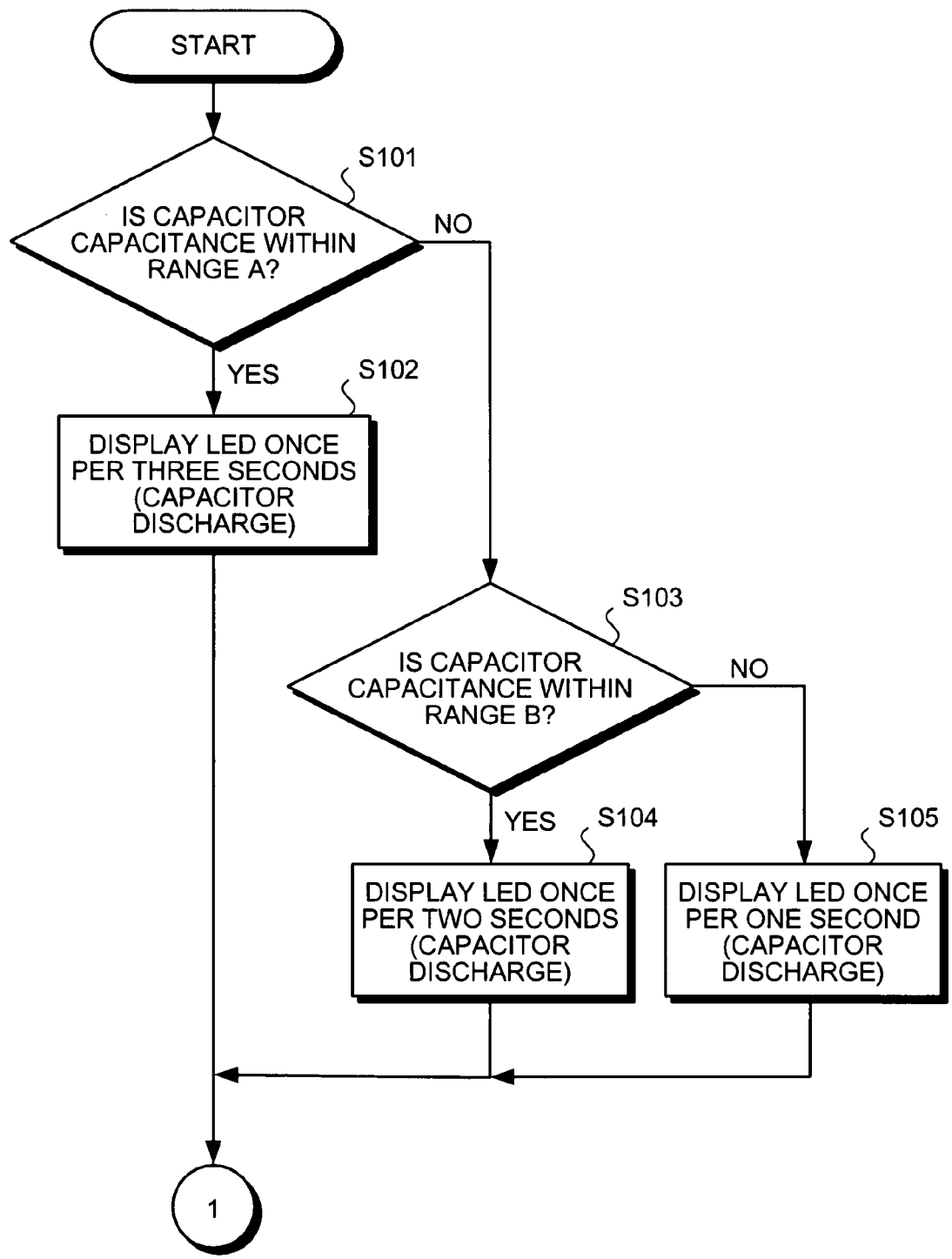
Figures 2, 3:
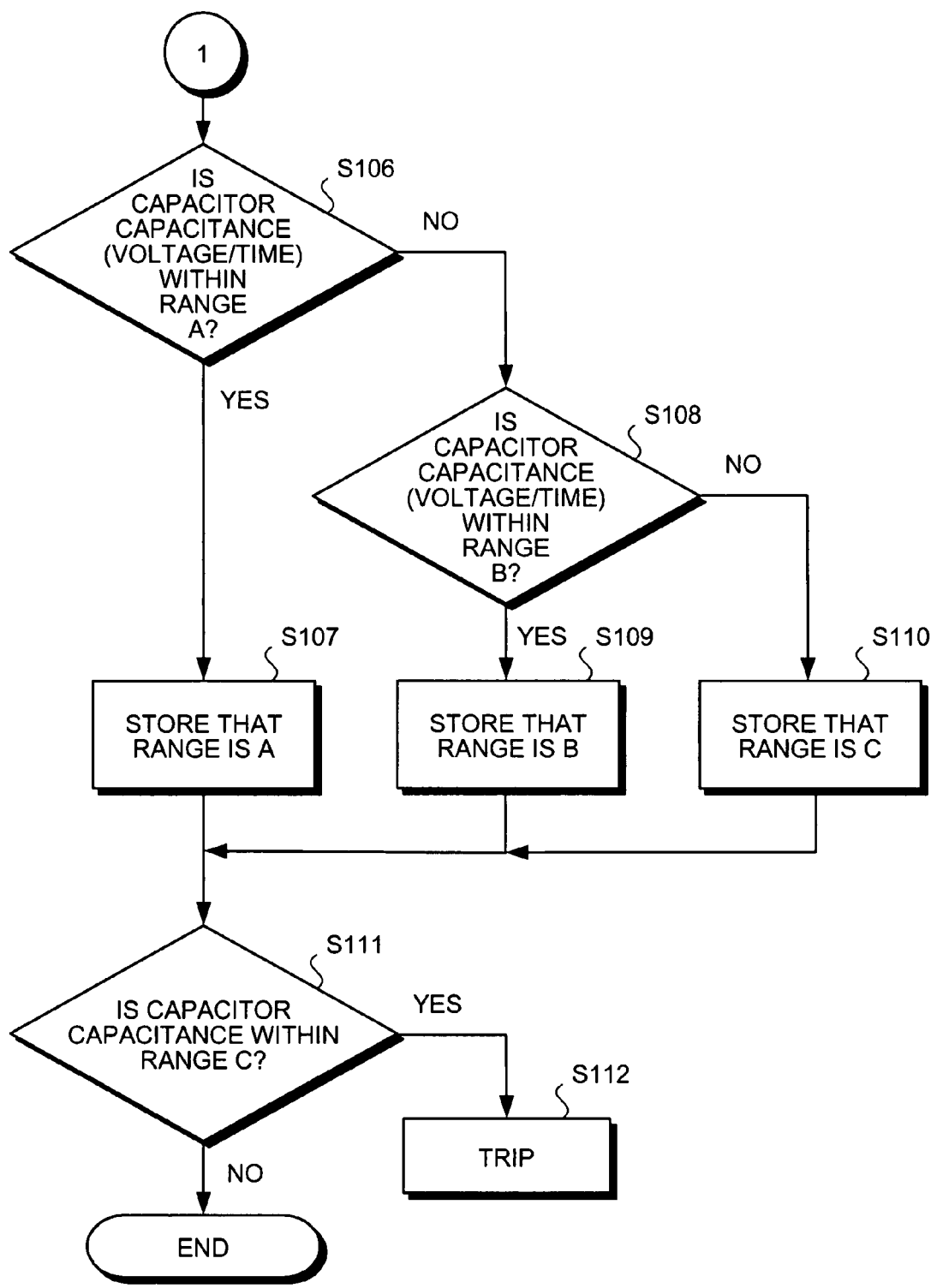

The operation that characterizes the present invention is explained with reference to FIG. 1 to FIG. 3-2. FIG. 3-1 is a flowchart showing a control flow of the display control of the overload relay. FIG. 3-2 is a flowchart showing an operation flow of a forced trip based on the degradation diagnosis of the capacitor. The operation shown in FIG. 3-2 is carried out following the control flow shown in FIG. 3-1.

The trip-power-source degradation-diagnosing unit 11 diagnoses the degradation state of the capacitor 21, and a result of the diagnosis is stored in a memory or the like (not shown), as the assumption of the operation. The display control unit 12 determines whether a result of the last diagnosis of the capacitor capacitance is in the range of the zone A (step S101). When the result of the last diagnosis of the capacitor capacitance is in the range of the zone A (step S101, Yes), the display control unit 12 controls the switching element 43 to flash-display the LED 42 in a first display interval (for example, a display of once per three seconds) (step S102). On the other hand, when a result of the last diagnosis of the capacitor capacitance is not in the range of the zone A (step S101, No), the display control unit 12 further determines whether the result of the last diagnosis of the capacitor capacitance is in the range of the zone B (step S103). When the result of the last diagnosis of the capacitor capacitance is in the range of the zone B (step S103, Yes), the display control unit 12 controls the switching element 43 to flash-display the LED 42 in a second display interval (for example, a display of once per two seconds) (step S104). When the result of the last diagnosis of the capacitor capacitance is not in the range of the zone B (that is, when the result of the last diagnosis is in the range of the zone C) (step S103, No), the display control unit 12 controls the switching element 43 to flash-display the LED 42 in a third display interval (for example, a display of once per one second) (step S104).

Based on the process of the display control at steps S101 to S105, a user can know the degradation state of a capacitor to be used as a trip power source of the capacitor, and can perform maintenance such as a prior replacement. When the overload relay is restarted, the capacitor is already in a degradation state. Therefore, in the first diagnosis after the restarting, the degradation of the capacitor is determined. Consequently, the user can determine whether a trip which occurs before is due to the abnormality of the capacitor or due to the abnormality of the load. For example, in the above example, after the overload relay is restarted, when the LED 42 flash-displays in the first display interval (once per three seconds) or in the second display interval (once per two seconds), the user can determine that the trip operation has occurred due to the abnormality of the load not due to the degradation of the capacitor.

Following the display control process at steps S101 to S105, the process shown in FIG. 3-2 is executed. First, the trip-power-source degradation-diagnosing unit 11 diagnoses a degradation state of the capacitor 21. The trip-power-source degradation-diagnosing unit 11 determines whether the capacitor capacitance (for example, a voltage difference/discharge time is used as an evaluation yardstick) is within the range of the zone A, in the diagnosis result (step S106). When the capacitor capacitance is within the range of the zone A (step S106, Yes), the trip-power-source degradation-diagnosing unit 11 stores that the capacitor capacitance is within the range of the zone A (step S107). On the other hand, when the capacitor capacitance is not within the range of the zone A (step S106, No), the trip-power-source degradation-diagnosing unit 11 determines whether the capacitor capacitance is within the range of the zone B (step S108). When the capacitor capacitance is within the range of the zone B (step S108, Yes), the trip-power-source degradation-diagnosing unit 11 stores that the capacitor capacitance is within the range of the zone B (step S109). However, when the capacitor capacitance is not within the range of the zone B (step S109, No), the trip-power-source degradation-diagnosing unit 11 stores that the capacitor capacitance is within the range of the zone C (step S110). Based on the result of the determination stored after the above determination process, it is determined whether the capacitor capacitance is within the range of the zone C (step S111). When the capacitor capacitance is within the range of the zone C, the trip-power-source degradation-diagnosing unit 11 forcibly trips the trip coil 22. In the forced trip, the capacitor 31 as a reset power source is also used in addition to the capacitor 21 as a trip power source, as described above, thereby energizing the trip coil 22.

Based on the forced trip control at steps S106 to S112, a state of being unable to perform the trip operation due to the degradation of the capacitor as a limited-life product can be avoided. Further, occurrence of a serious accident such as burnout of the load to be protected that is connected to the overload relay can be prevented. Even when the forced trip cannot be performed by using only the trip capacitor due to the progressed degradation of the capacitor, the trip control can be performed by using the reset capacitor as well as the trip capacitor. Therefore, energy necessary for the trip operation can be compensated for, and the load to be protected can be stopped securely and safely.

In the overload relay according to the present embodiment, the display unit 40 including the resistor element 41, the LED 42, and the switching element 43 displays information on the degradation state of the capacitor. Alternatively, a result of monitoring performed by the current monitoring unit 15, for example, can be displayed by the LED 42, by using this display function. For example, when several flash patterns using the LED 42 are prepared, the overcurrent of the load and the phase failure state monitored by the current monitoring unit 15 can be also displayed, in addition to the degradation state of the capacitor.

Second Embodiment

Figure 4:
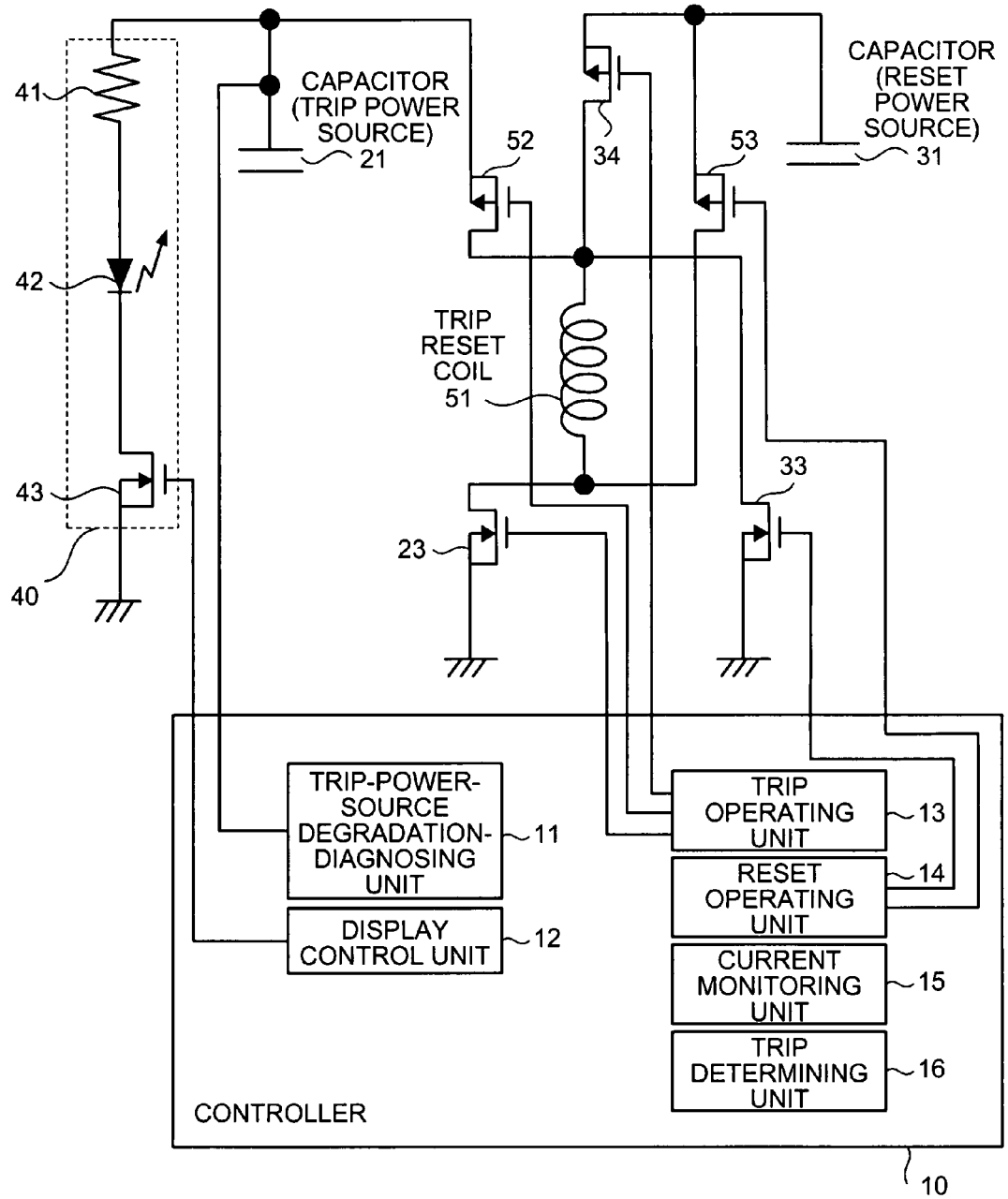
FIG. 4 is a configuration diagram of an overload relay according to a second embodiment of the present invention.

FIG. 4 is a configuration diagram of an overload relay according to a second embodiment of the present invention. The overload relay according to the first embodiment shown in FIG. 1 includes the trip coil 22 and the reset coil 32 separately. However, in the configuration shown in FIG. 4, a trip reset coil 51 serves as both the trip coil and the reset coil as one coil.

In the above configuration, the drain of the switching element 33 connected to the other end of the reset coil 32 is connected to one end of the trip reset coil 51, and, the drain of the switching element 23 connected to the other end of the trip coil 22 is connected to the other end of the trip reset coil 51. New switching elements 52 and 53 are added. A source of the switching element 52 is connected to one end of the capacitor 21 (the trip power source), and a drain of the switching element 52 is connected to one end of the trip reset coil 51. At the same time, a source of the switching element 53 is connected to one end of the capacitor 31 (the reset power source), and a drain of the switching element 53 is connected to the other end of the trip reset coil 51. Further, a gate of the switching element 52 is connected to the trip operating unit 13 to receive the control from the trip operating unit 13, similarly to the switching element 23. A gate of the switching element 53 is connected to the reset operating unit 14 to receive the control from the reset operating unit 14, similarly to the switching element 33. Other configurations are identical with or equivalent to those of the first embodiment shown in FIG. 1. These constituent elements are attached with the same reference numerals, and their explanations are omitted.

In the configuration shown in FIG. 4, the additionally provided switching elements 52 and 53 are disposed at the high side (at the high-potential side), and a P-type FET is used for these switching elements, respectively. Alternatively, disposal positions and types of these switching elements can be optional. However, from the viewpoint of easily configuring the overload relay, needless to mention, it is preferable to select a suitable type according to a position at which each switching element is disposed and the like, similarly to the first embodiment.

The operation of the overload relay shown in FIG. 4 is explained next. The basic operation is similar to that of the overload relay shown in FIG. 1, and only key operations are explained below.

With reference to FIG. 4, during the normal trip operation, the trip operating unit 13 turns on the switching element 23 and the switching element 52, based on a result of determination performed by the trip determining unit 16, thereby energizing the trip reset coil 51. On the other hand, during the forced trip operation, the trip operating unit 13 turns on the switching element 23 and the switching element 52, based on a result of diagnosis performed by the trip-power-source degradation-diagnosing unit 11, and also turns on the switching element 34. By this control, the charges stored in both the capacitor 21 and the capacitor 31 are used to energize the trip reset coil 51, in a similar manner to that of the first embodiment, thereby obtaining effects similar to those of the first embodiment.

With reference to FIG. 4, the reset operating unit 14 turns on the switching element 33 and the switching element 53 based on a result of the determination performed by the trip determining unit 16, thereby energizing the trip reset coil 51. As shown in FIG. 4, the circuit is configured such that the direction of the current that flows through the trip reset coil 51 during the trip operation (including the forced trip operation) is opposite to the direction of the current that flows through the trip reset coil 51 during the reset operation. Therefore, the trip coil and the reset coil can be shared.

As described above, according to the second embodiment, the circuit configuration of the overload relay can be simplified, by sharing the trip coil and the reset coil. As a result, reliability of the overload relay can be improved.

INDUSTRIAL APPLICABILITY

As described above, the overload relay and the method of operating the overload relay according to the present invention are useful for the self-feeding-type overload relay.

The invention claimed is:

1. An overload relay that trips a current flow between a power source and a load, the overload relay comprising:
   a trip capacitor that stores therein an electric charge as a trip charge;
   a reset capacitor that stores therein an electric charge as a reset charge;
   a trip coil that is configured to be excited by the trip charge so as to trip the current flow;
   a reset coil that is configured to be excited by the reset charge so as to reset tripped current flow;
   an energizing unit that energizes the trip coil by using the trip charge, and energizes the reset coil by using the reset charge;
   a capacitor-diagnosing unit that diagnoses whether there is degradation of a property of the trip capacitor; and
   a display unit that displays result of diagnosis made by the capacitor-diagnosing unit; wherein
   the energizing unit forcibly energizes the trip coil when the capacitor-diagnosing unit diagnoses that there is degradation of the property of the trip capacitor.

2. The overload relay according to claim 1, wherein
   the capacitor-diagnosing unit differentiates the trip capacitor in at least three states based on the diagnosis, the three states including
   a normal state in which the trip capacitor is normal,
   a replacement recommendation state in which the trip capacitor is near to be degraded, and
   a degradation state in which the trip capacitor is degraded, and
   the display unit displays the states in a different manner.

3. The overload relay according to claim 2, further comprising a current monitoring unit that monitors a magnitude of the current flow, wherein
   the display unit further displays information on a result of monitoring obtained by the current monitoring unit.

4. An overload relay that trips a current flow between a power source and a load, the overload relay comprising:

a trip capacitor that stores therein an electric charge as a trip charge;

a reset capacitor that stores therein an electric charge as a reset charge;

a trip coil that is configured to be excited by the trip charge so as to trip the current flow;

a reset coil that is configured to be excited by the reset charge so as to reset tripped current flow;

an energizing unit that energizes the trip coil by using the trip charge, and energizes the reset coil by using the reset charge; and a capacitor-diagnosing unit that diagnoses whether there is degradation of a property of the trip capacitor, wherein the energizing unit forcibly energizes the trip coil when the capacitor-diagnosing unit diagnoses that there is degradation of the property of the trip capacitor, the capacitor-diagnosing unit differentiates the trip capacitor in at least three states based on diagnosis of the property of the trip capacitor, the three states including a normal state in which the trip capacitor is normal, a replacement recommendation state in which the trip capacitor is near to be degraded, and a degradation state in which the trip capacitor is degraded, the energizing unit energizes the trip coil by using only the trip charge when the capacitor-diagnosing unit differentiates that the trip capacitor is in the normal state or the replacement recommendation state, and the energizing unit energizes the trip coil by using both of the trip charge and the reset charge when the capacitor-diagnosing unit differentiates that the trip capacitor is in the degradation state.

5. An overload relay that trips a current flow between a power source and a load, the overload relay comprising:

a trip capacitor that stores therein an electric charge as a trip charge;

a reset capacitor that stores therein an electric charge as a reset charge;

a trip coil that is configured to be excited by the trip charge so as to trip the current flow;

a reset coil that is configured to be excited by the reset charge so as to reset tripped current flow;

an energizing unit that energizes the trip coil by using the trip charge, and energizes the reset coil by using the reset charge; and a capacitor-diagnosing unit that diagnoses whether there is degradation of a property of the trip capacitor, wherein the energizing unit forcibly energizes the trip coil when the capacitor-diagnosing unit diagnoses that there is degradation of the property of the trip capacitor, the trip coil and the reset coil are configured to be a same coil as a trip-reset coil that functions both to trip the current flow and to reset the tripped current flow, and the energizing unit is connected in a manner that a current conduction direction when the trip-reset coil functions to trip is opposite to a current conduction direction when the trip-reset coil functions to reset.

6. The overload relay according to claim 5, wherein the energizing unit forcibly energizes the trip-reset coil by using both of the trip charge and the reset charge.

7. A method of operating an overload relay that includes a trip capacitor that stores therein an electric charge as a trip charge to excite a trip coil so as to trip a current flow between a power source and a load, and that includes a reset capacitor that stores therein an electric charge as a reset charge to excite a reset coil so as to reset tripped current flow, the method comprising:

diagnosing whether there is degradation of a property of the trip capacitor; and exciting the trip coil forcibly by using the trip charge when it is diagnosed at the diagnosing that there is degradation of a property of the trip capacitor, wherein the method further includes differentiating the trip capacitor in at least three states based on result of diagnosis at the diagnosing, the three states including a normal state in which the trip capacitor is normal, a replacement recommendation state in which the trip capacitor is near to degraded, and a degradation state in which the trip capacitor is degraded, the exciting includes exciting the trip coil by using only the trip charge when the trip capacitor is differentiated at the differentiating that the state is in the normal state or the replacement recommendation state, and the exciting includes exciting the trip coil by using both of the trip charge and the reset charge when the trip capacitor is differentiated at the differentiating that the state is in the degradation state.

* * * * *